No. 800,638. PATENTED OCT. 3, 1905.
W. GARDINER.
STORAGE BATTERY.
APPLICATION FILED JUNE 11, 1904.
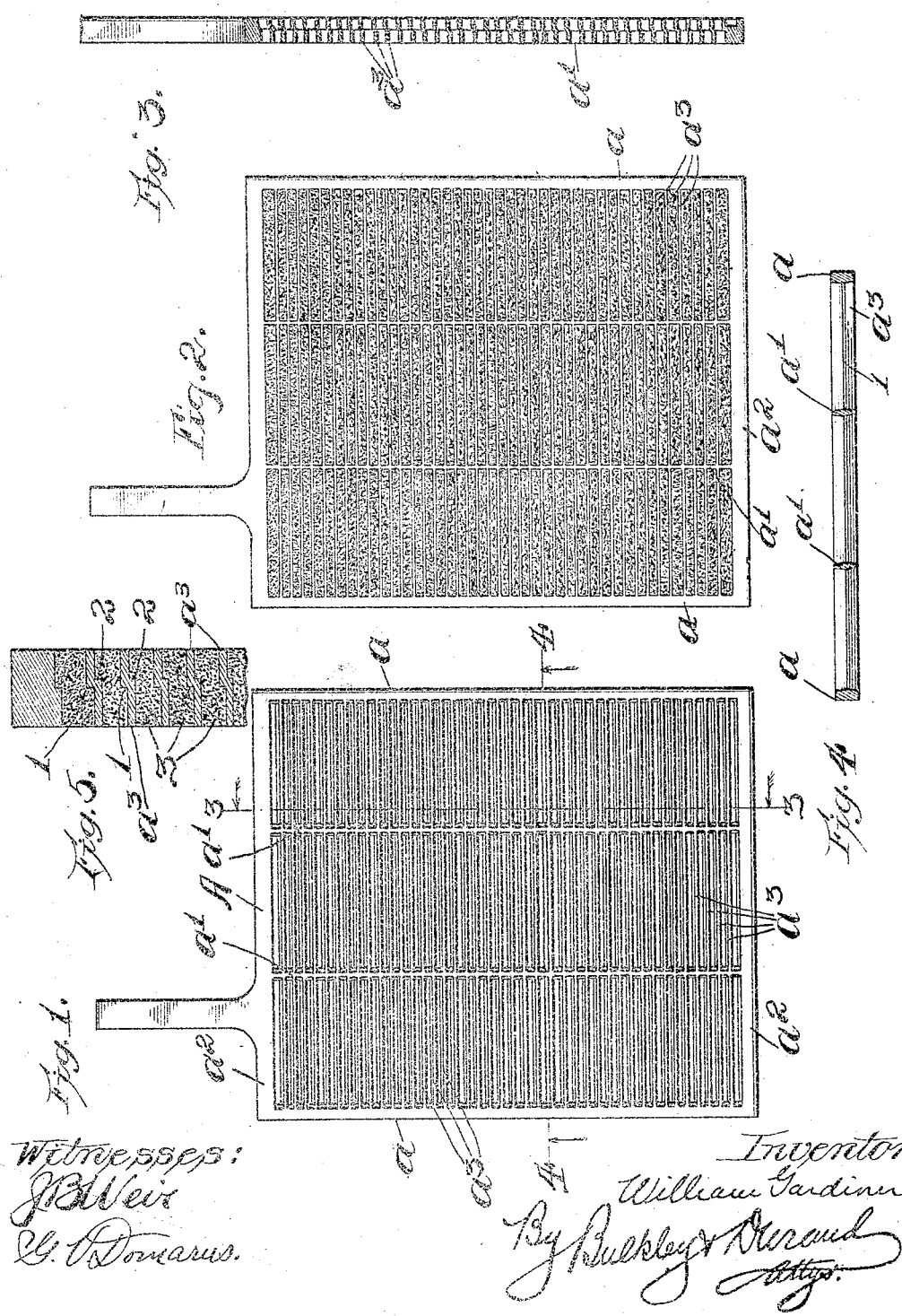

UNITED STATES PATENT OFFICE.

WILLIAM GARDINER, OF CHICAGO, ILLINOIS, ASSIGNOR, BY MESNE ASSIGNMENTS, OF ONE-HUNDRED AND FIFTY-ONE TWO-HUNDREDTHS TO UNIVERSAL ELECTRIC STORAGE BATTERY COMPANY, OF CHICAGO, ILLINOIS, A CORPORATION OF DELAWARE.

STORAGE BATTERY.

No. 800,638.      Specification of Letters Patent.      Patented Oct. 3, 1905.

Application filed June 11, 1904. Serial No. 212,135.

*To all whom it may concern:*

Be it known that I, WILLIAM GARDINER, a citizen of the United States of America, and a resident of Chicago, Cook county, and State of Illinois, have invented a certain new and useful Improvement in Storage Batteries, of which the following is a specification.

My invention relates more particularly to storage-battery plates of that type or character in which the plate comprises a grid provided with recesses or openings filled with hardened masses of paste or material to become active when the plate is used in a battery.

Generally stated, the object of my invention is the provision of a simple, improved, and highly-efficient storage-battery plate of the foregoing general character.

A special object is to provide an improved construction and formation of the lead grid whereby the same will not tend to warp or buckle or get out of shape and will at the same time present a maximum of conducting-surface.

Another object is to provide an improved construction and formation of the grid whereby the paste or material to become active may be continuous in character from one face of the plate to the other and whereby these portions of paste or active material thus extending continuously from one side of the plate to the other cannot possibly become dislodged or separated from the grid.

A further object is to provide an improved construction and arrangement for insuring, comparatively or relatively speaking, a maximum of active surface and a minimum of inactive surface, as hereinafter set forth, and for at the same time insuring a high degree of conductivity for the plate.

The nature and advantages of my invention will, however, hereinafter more fully appear.

In the accompanying drawings, Figure 1 is a face view of a storage-battery grid embodying the principles of my invention. Fig. 2 is a similar view, but showing the grid filled with the paste or material to become active. Fig. 3 is a vertical section on line 3 3 in Fig. 1. Fig. 4 is a horizontal section on line 4 4 in Fig. 1. Fig. 5 is an enlarged vertical section through the upper portion of the plate shown in Fig. 2.

As thus illustrated, my improved storage-battery plate comprises the lead grid A, of any suitable form or construction, but preferably involving side and intermediate uprights $a$ and $a'$, which are connected by top and bottom and intermediate horizontal cross-pieces $a^2$ and $a^3$.

Referring to Fig. 4, it will be seen that the intermediate uprights $a'$ are preferably thicker at their centers than at their outer edges and that the side uprights $a$ have their inner surfaces correspondingly beveled.

Referring to Figs. 3 and 5, it will be seen that the cross-pieces $a^3$ are each formed with longitudinally-extending top and bottom offsets 1 and 2, these offsets facing in opposite directions. Consequently the cavities or recesses between these cross-pieces $a^3$ have their top and bottom walls each provided with offsets or shoulders facing in opposite directions. With this construction and formation it is evident that the plugs or masses of paste or material to become active, 3, are securely held in place. Furthermore, it will be seen that these narrow and horizontally-extending masses of paste or material to become active are continuous from one face of the plate to the other. In addition the formation of the grid is such, it will be observed, that it will not tend to warp or buckle when subjected to heavy charging and discharging; also, the formation not only tends to prevent buckling and to hold the paste securely in place, but in addition presents a maximum or practically a maximum of metallic conducting-surface.

Thus it will be seen that by my invention I provide a storage-battery plate of an exceedingly simple and highly-efficient character, and that consequently the plate is not only of a character to insure highly-satisfactory results in use, but also of such nature as to facilitate and render the manufacture of the plate more satisfactory.

It will be seen that my improved plate is essentially formed with horizontal strips having offsets, the two offsets facing in opposite directions and the offset surfaces being vertical and at right angles to the horizontal top and bottom surfaces of the said portions. In this way the masses of paste or material to become active have no tendency to slide or fall out of the recesses at one side of the plate. Also with this formation of the offsets facing in opposite directions and standing vertically and at right angles to the top and bottom portions of the cross-pieces or horizontal portions it will be seen that the pockets or recesses are arranged in rows both vertically and horizontally, the members of each vertical row being arranged side to side and the members of each horizontal row being arranged end to end. This construction I find gives good results in use and renders the grid comparatively cheap and economical to manufacture.

As the horizontal portions $a^3$ have thin and unbroken or continuous outer edges, it is obvious that only a very small or minimum amount of inactive surface or metal surface is exposed and that a comparatively large or maximum amount of active or paste surface is exposed, while at the same time the plate has a high degree of conductivity, so that the ability of the battery to carry off the current is amply sufficient, notwithstanding its liberal or strong generating capacity.

In the foregoing description and in the following claims the expression "active surface" will be understood to mean the exposed surface of the paste or material to become active, while the expression "inactive surface" will be understood to mean the exposed surface of the metal grid.

What I claim as my invention is—

1. A storage-battery plate comprising a lead grid having cross-pieces each formed with longitudinally-extending top and bottom offsets facing in opposite directions, and suitable material to become active held in the recesses formed between the said cross-pieces, the top and bottom surfaces of said cross-pieces extending horizontally from one face of the plate to the other, the said offset surfaces being vertical and at right angles to said horizontal surfaces, said horizontal portions of the grid having comparatively thin and straight unbroken outer edges, whereby the opposite surfaces of the plate, when in use, present a maximum of active surface and a minimum of inactive surface.

2. A lead grid having horizontal portions each formed with top and bottom offsets facing in opposite directions, said offset surfaces being vertical and at right angles to the top and bottom surfaces of said horizontal portions, said horizontal portions of the grid having comparatively thin and straight unbroken outer edges, whereby the opposite surfaces of the plate, when in use, present a maximum of active surface and a minimum of inactive surface.

3. A lead grid having a number of parallel portions providing recesses between them and each formed with a couple of offsets located at opposite sides and facing in opposite directions, said offset surfaces being vertical and at right angles to the top and bottom surfaces of said parallel portions, whereby said recesses are arranged end to end in rows extending horizontally and parallel with each other across the grid, said horizontal portions of the grid having comparatively thin and straight unbroken outer edges, whereby the opposite surfaces of the plate, when in use, present a maximum of active surface and a minimum of inactive surface.

4. A lead grid having a number of parallel portions providing openings or recesses between them and each formed at a point near its center but at opposite sides thereof with longitudinally-extending offsets out of line with each other and facing in opposite directions, said offset surfaces being vertical and at right angles to the top and bottom surfaces of the said parallel portions, and the said recesses being arranged in rows, both vertically and horizontally, the members of the vertical rows being arranged side to side, and the members of the horizontal rows being arranged end to end, said horizontal portions of the grid having comparatively thin and straight unbroken outer edges, whereby the opposite surfaces of the plate, when in use, present a maximum of active surface and a minimum of inactive surface.

5. A lead grid having parallel portions providing recesses between them and each formed at its center with an upper longitudinally-extending offset facing in one direction and with a lower longitudinally-extending offset facing in an opposite direction, said offset surfaces being vertical and at right angles to the horizontal top and bottom surfaces of said parallel portions, whereby each of said parallel portions consists in cross-section of an upper horizontal portion and lower horizontal portion, and a middle vertical portion connecting the inner ends of the two horizontal portions, said horizontal portions of the grid having comparatively thin and straight unbroken outer edges, whereby the opposite surfaces of the plate, when in use, present a maximum of active surface and a minimum of inactive surface.

6. A storage-battery plate comprising a lead grid having a plurality of upright portions and having also a plurality of parallel horizontal portions connecting said upright portions, each horizontal portion being formed at a point near its center with an upper longitudinally-extending offset facing in one direction and a lower longitudinally-extending offset facing in an opposite direction, and masses of active material securely held by said offsets in the recesses formed between said horizontal portions of the grid, said offset surfaces being vertical and at right angles to the horizontal top and bottom surfaces of said parallel horizontal portions, each of the parallel horizontal portions thereby consisting in cross-section of upper and lower horizontal portions connected at their inner ends by a vertically-extending middle portion, and the said masses of active material being arranged in rows, both vertically and horizontally, the members of each vertical row being arranged side to side, and the members of each horizontal row being arranged end to end, said horizontal portions of the grid having comparatively thin and straight unbroken outer edges, whereby the opposite surfaces of the plate, when in use, present a maximum of active surface and a minimum of inactive surface.

7. A metal grid having parallel portions providing recesses between them, and each provided at opposite sides with offsets facing outwardly in opposite directions, each parallel portion consisting in cross-section of upper and lower horizontal outer portions, and a vertical middle portion connecting the inner ends of said horizontal outer portions, said horizontal portions of the grid having comparatively thin and straight unbroken outer edges, whereby the opposite surfaces of the plate, when in use, present a maximum of active surface and a minimum of inactive surface.

Signed by me at Chicago, Cook county, Illinois, this 8th day of June, 1904.

WILLIAM GARDINER.

Witnesses:
CLARENCE M. THORNE,
A. F. DURAND.